(12) United States Patent
Harnisch et al.

(10) Patent No.: US 8,639,421 B2
(45) Date of Patent: Jan. 28, 2014

(54) INDUSTRIAL TRUCK WITH AN ELECTRIC TRAVEL DRIVE

(75) Inventors: Carsten Harnisch, Hamburg (DE);
Dominik Plachta, Oersdorf (DE);
Hendrik Geilsdorf, Hamburg (DE)

(73) Assignee: Jungheinrich Aktiengesellschaft, Hamburg (DE)

( * ) Notice: Subject to any disclaimer, the term of this patent is extended or adjusted under 35 U.S.C. 154(b) by 240 days.

(21) Appl. No.: 13/227,051

(22) Filed: Sep. 7, 2011

(65) Prior Publication Data

US 2012/0226419 A1 Sep. 6, 2012

(30) Foreign Application Priority Data

Sep. 8, 2010 (DE) .................. 10 2010 044 655

(51) Int. Cl.
*B60L 7/28* (2006.01)
*B66F 9/24* (2006.01)
*G06F 19/00* (2011.01)

(52) U.S. Cl.
USPC ............................ 701/50; 701/70; 180/65.21

(58) Field of Classification Search
USPC ................... 701/50, 70, 22; 188/158, 164; 180/65.21; 310/77
See application file for complete search history.

(56) References Cited

U.S. PATENT DOCUMENTS

| 3,506,862 | A | 4/1970 | Nomura et al. | |
|---|---|---|---|---|
| 6,084,325 | A | 7/2000 | Hsu | |
| 8,393,443 | B2 * | 3/2013 | Evans | 188/164 |
| 2003/0010584 | A1 | 1/2003 | Chen | |
| 2003/0189380 | A1 * | 10/2003 | Ishikawa et al. | 310/77 |
| 2010/0039054 | A1 | 2/2010 | Young et al. | |
| 2011/0290571 | A1 * | 12/2011 | Klopzig et al. | 180/65.21 |

FOREIGN PATENT DOCUMENTS

| DE | 3908234 | 8/1990 |
|---|---|---|
| DE | 19547464 | 4/1997 |
| DE | 19731847 | 9/1998 |
| DE | 10310105 | 12/2003 |
| DE | 102006019494 | 10/2007 |
| DE | 102006051264 | 5/2008 |
| DE | 102009006196 | 8/2010 |
| EP | 2006563 | 12/2008 |
| GB | 2387418 | 10/2003 |
| JP | 2000032797 | 1/2000 |
| JP | 2007082337 | 3/2007 |
| WO | 2007/053889 | 5/2007 |

OTHER PUBLICATIONS

Kurz, Heinz, Neue InterCityExpress-Triebzüge für die Deutsche Bahn In: eb-Elektrische Bahnen, Band 93, 1995, Magazine 1/2, pp. 15-24, p. 22 and 23.

* cited by examiner

*Primary Examiner* — Tan Q Nguyen
(74) *Attorney, Agent, or Firm* — Vidas, Arrett & Steinkraus

(57) ABSTRACT

Industrial truck with an electric travel drive and controls that can switch the electric travel drive to regenerative operation to brake the industrial truck, wherein an eddy current brake is provided that can be controlled or regulated by the controls during regenerative operation to brake the industrial truck, wherein the controls control or regulate the eddy current brake depending on the rpm of the electric travel drive, and wherein the controls control or regulate the eddy current brake in a manner such that the braking torque of the travel drive is supplemented at high rpms by the braking torque generated by the eddy current brake.

10 Claims, 6 Drawing Sheets

INDUSTRIAL TRUCK WITH AN ELECTRIC TRAVEL DRIVE

CROSS-REFERENCE TO RELATED APPLICATIONS

Not applicable

STATEMENT REGARDING FEDERALLY SPONSORED RESEARCH

Not applicable

BACKGROUND OF THE INVENTION

The present invention relates to an industrial truck having an electric travel drive that can be switched by controls to regenerative operation in order to brake the industrial truck. In regenerative operation, the travel drive is used as a generator, the generated current of which is supplied to a battery.

An automated spring-operated brake for an industrial truck is known from EP 2 006 563 A1, the entire contents of which is incorporated herein by reference. A magnet arrangement in the form of an eddy current brake that interacts with a brake provided with friction linings can be provided in the known industrial truck.

An industrial truck is known from DE 10 2006 051 264 A1, the entire contents of which is incorporated herein by reference, with a drive axle that is equipped with an electrical or hydraulic traction motor for the travel drive, and that is equipped with an eddy current brake. To exploit the advantages of an eddy current brake, the industrial truck is equipped with an internal combustion engine. The provided electric motor is exclusively operated as a motor and not as a generator.

An industrial truck with a brake device is known from DE 10 2006 051 264 A1, the entire contents of which is incorporated herein by reference, that has an electric or hydraulic traction motor for the travel drive and at least one brake device for braking a traveling motion of the forklift, and the brake device is designed as an eddy current brake. When an electric traction motor is used, it is exclusively operated as a motor and not as a generator.

A brake system for a vehicle with an electric motor is known from DE 10 2006 019 494 A1, the entire contents of which is incorporated herein by reference, that has a mechanical brake as well as additionally an electric brake. Depending on the actuation of a brake actuation device, first only the electric brake is activated which is followed by the mechanical brake.

A control and/or regulating device for a retarder as an additional brake device, especially for vehicles, is known from DE 197 31 847 A1, the entire contents of which is incorporated herein by reference. The control and regulation device has a controllable power semiconductor as an actuator for the current flowing through the retarder which can be adjusted depending on one or more operating parameters of the vehicle. A special feature of the control and regulating device is that it is automatically shut off at a speed below a threshold.

A control algorithm for an eddy current brake system is known from DE 103 10 105 A1, the entire contents of which is incorporated herein by reference, by means of which a control current is determined as a function of the feedback current depending on a determined feedback current of a retarder assembly and a rotor speed of the retarder assembly.

An additional braking device for trucks and omnibuses with an electric eddy current brake is known from DE 39 08 234 A1, the entire contents of which is incorporated herein by reference, where the eddy current brake is equipped with its own electric generator, the excitation current of which is drawn from the vehicle onboard power supply to achieve a minimum load on the onboard power supply while the eddy current brake is operating.

A control algorithm for an eddy current brake in a motor vehicle is known from GB 2 387 418 A, the entire contents of which is incorporated herein by reference. To regulate the eddy current brake, a feedback current from the eddy current brake and a rotor speed of the rotor of the eddy current brake are determined, and the control current for the eddy current brake is determined by a regulator from a setpoint value for the eddy current brake.

The control of a vehicle is known from US 2010/0039054 A1, the entire contents of which is incorporated herein by reference, in which electrical power is provided for an electric travel drive with the assistance of a mechanically operated generator. When an eddy current brake is used and the electrical power generated thereby is greater than the power required for the travel drive, the electric travel drive is supplied from the eddy current brake.

An automatic spring operated brake for an industrial truck is known from EP 2 006 563 A1, the entire contents of which is incorporated herein by reference, that has an electromagnetically actuatable parking brake.

An electric travel drive for a vehicle is known from WO 2007/053889 A1, the entire contents of which is incorporated herein by reference, where a brake disc is also designed as a rotor for an electric motor.

To brake industrial trucks, it is often unsuitable to use a single stage friction brake since, being designed for a maximum load, it excessively brakes a vehicle without a load.

The use of the travel motor as a generator is known for electrically operated industrial trucks such as, for example, reach trucks, high lift trucks and low lift trucks, etc. In the design of the travel drive, the demand is shifted to motor operation with the aim of minimizing the output of the travel drive for reasons of economy and energy efficiency. Consequently, however, in particular at high speeds and high payloads, the output of the travel drive in generator operation is frequently insufficient to achieve the required stopping distances.

BRIEF SUMMARY OF THE INVENTION

The object of the invention is to provide an industrial the truck having an electric travel drive that can be used in regenerative operation to brake the industrial truck, wherein a sufficiently high braking torque is generated for the industrial truck to reliably brake it in a loaded state on ramps and/or when the vehicle battery is nearly fully charged.

The industrial truck according to the invention is equipped with an electric travel drive and controls that can switch the electric travel drive to regenerative operation to brake the industrial truck. The regenerative current thereby obtained is preferably used to recharge the vehicle battery. The industrial truck according to the invention is also equipped with an eddy current brake that is controlled or regulated by the controls to brake the industrial truck during regenerative operation of the travel drive. According to the invention, the industrial truck is additionally braked by an eddy current brake during regenerative operation of the travel drive in the industrial truck, and the braking torque generated thereby is controlled or regulated by the controls. The advantage of the additionally used eddy current brake is that the electric travel drive can also be designed according to the requirements of the travel drive of the industrial truck. The eddy current brake is also used during regenerative braking to prevent potentially occurring excessive regenerative current and hence a battery overvoltage or, under large loads, to generate additional braking torque for the industrial truck.

According to the invention, the controls control or regulate the eddy current brake depending on the rpms of the electric travel drive. This is based on the awareness that only a small braking torque arises with an electric travel drive, especially at high rpms in regenerative operation. This low braking torque at high rpms is supplemented by the braking torque generated by the eddy current brake, wherein the eddy-current brake generates additional braking torque. The invention therefore makes it possible to achieve sufficiently strong braking torque by additionally controlling the eddy current brake even at high rpms at which the regenerative operation only offers a slight braking torque.

In one particularly preferred embodiment, the controls specify a setpoint for the braking torque to be generated by the eddy current brake, and control the eddy current brake corresponding to the setpoint, or regulate the eddy current brake to the corresponding setpoint. In this embodiment, the brake controls function as a setpoint generator for the eddy current brake so that the desired braking torque is generated for the industrial truck by the eddy current brake.

In a preferred embodiment, the controls determine the setpoint for the braking torque of the eddy current brake depending on the rpms of the electric travel drive. The setpoint specified by the controls is preferably dependent on the rpms, and as the rpms decrease, the setpoint for the eddy current brake decreases to the extent which the braking torque increases from regenerative operation. This means that any braking torque of the electric travel drive that is too low in its regenerative operation at high rpms is supplemented by a correspondingly specified setpoint for the braking torque of the eddy current brake. Preferably, the controls determine the setpoint for the eddy current brake in a manner such that a resulting braking torque from the regenerative operation of the travel drive and the eddy current brake remains constant. In this manner, a constant braking torque can always be generated for the industrial truck so that the vehicle is reliably braked even when the electric travel drive is at high rpms.

A preferred development of the industrial truck according to the invention provides that the controls dynamically specify the setpoint for the eddy current brake during the braking process to prevent the drive wheel or wheels from locking while braking. Eddy current brakes are particularly suitable for implementing an ABS function.

In a preferred embodiment of the invention, the eddy current brake can also be alternately or additionally controlled or regulated depending on a detected battery voltage. The controls are designed to this end to detect the battery voltage arising during the generative operation of the travel drive and compare it with a predetermined maximum value. In a case in which the maximum value of the battery voltage is exceeded, the braking torque of the regeneratively operated travel drive can be reduced, and the braking torque in the eddy current brake can be increased. This embodiment can prevent the occurrence of overvoltages due to excessive regenerative current that triggers an emergency stop in the industrial truck.

Alternately, a value can be detected for the regenerative current depending on the charge of the vehicle battery, compared with a maximum value for the regenerative current, and it can be reduced when the maximum value of peak torque of the travel drive is exceeded while simultaneously increasing the braking torque of the eddy current brake. This ensures even braking with a correspondingly high braking torque of the eddy current brake independent of the battery charge.

In another preferred embodiment, the controls detect a load taken on by the industrial truck, and increase the setpoint for the braking torque of the eddy current brake corresponding to the load. In this case as well, the necessary overall braking torque is adjusted for the industrial truck depending on the load.

BRIEF DESCRIPTION OF THE SEVERAL VIEWS OF THE DRAWINGS

The present invention will be further explained below with reference to figures. They show.

DETAILED DESCRIPTION OF THE INVENTION

While this invention may be embodied in many different forms, there are described in detail herein a specific preferred embodiment of the invention. This description is an exemplification of the principles of the invention and is not intended to limit the invention to the particular embodiment illustrated.

Figure 1:
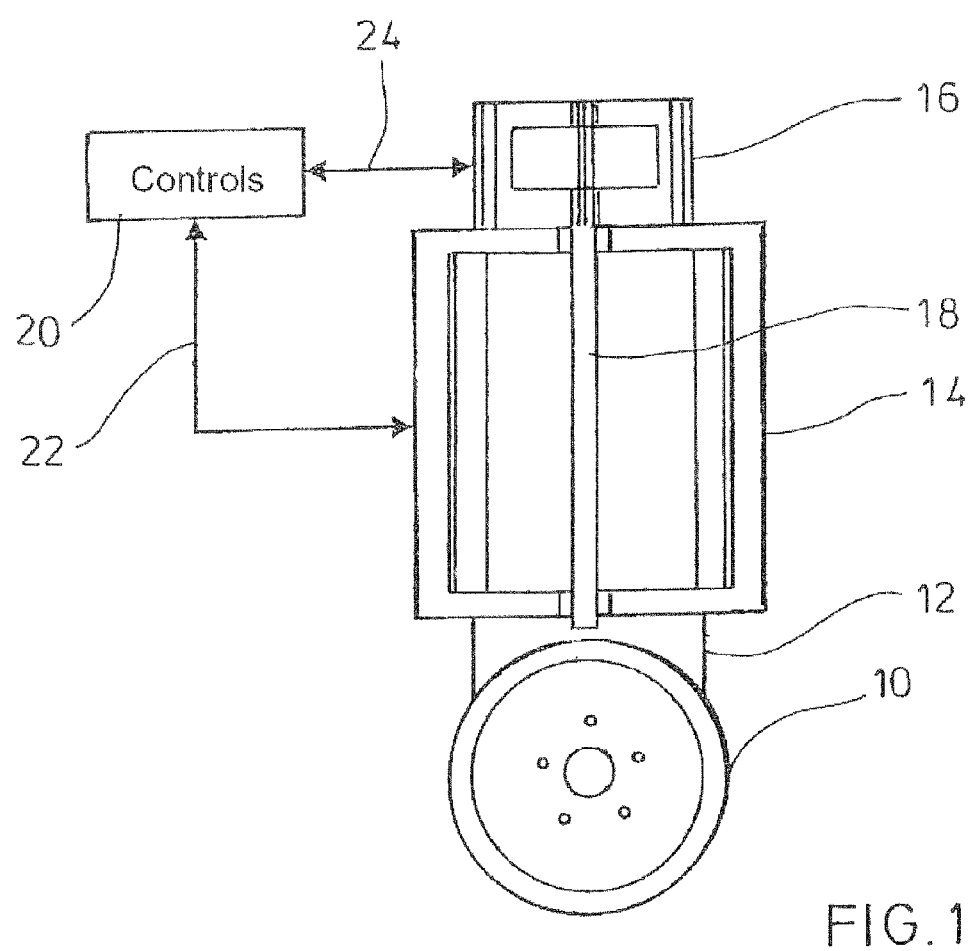
FIG. 1 a schematic view of the driven wheel in an industrial truck with an eddy current brake, FIG. 2 an rpm/torque characteristic for an electric travel drive, and FIG. 3 the braking torque generated with a regulated eddy current brake in the industrial truck, FIG. 4 a load-dependent specification of the braking torque for the eddy current brake, FIG. 5 a schematic flowchart of an increase in the braking torque of the eddy current brake depend on the battery voltage, and FIG. 6 a schematic view of a regulation of the braking torque with reference to a predetermined rpm or speed ramp.

FIG. 1 schematically portrays the design of a travel drive in an industrial truck. A drive wheel 10 is driven by a single or multi-speed transmission 12 with the aid of the electric traction motor 14. The electric traction motor is for example an AC asynchronous motor, but other electrical machines can also be used such as synchronous motors. At the end of the traction motor facing away from the drive wheel, a system brake is provided that has an eddy current brake and an additional parking brake. The system brake 16 acts directly on the armature 18 of the traction motor 14. Controls 20 are provided that detect a motor rpm and motor current via a connection 22. The current setpoint variables for the electric travel drive are also sent to the drive via the connection 22. The regulation of the eddy current brake within the system brake 16 occurs via the connection 24. The goal of regulating the eddy current brake is to keep the braking torque as constant as possible.

Figure 2:
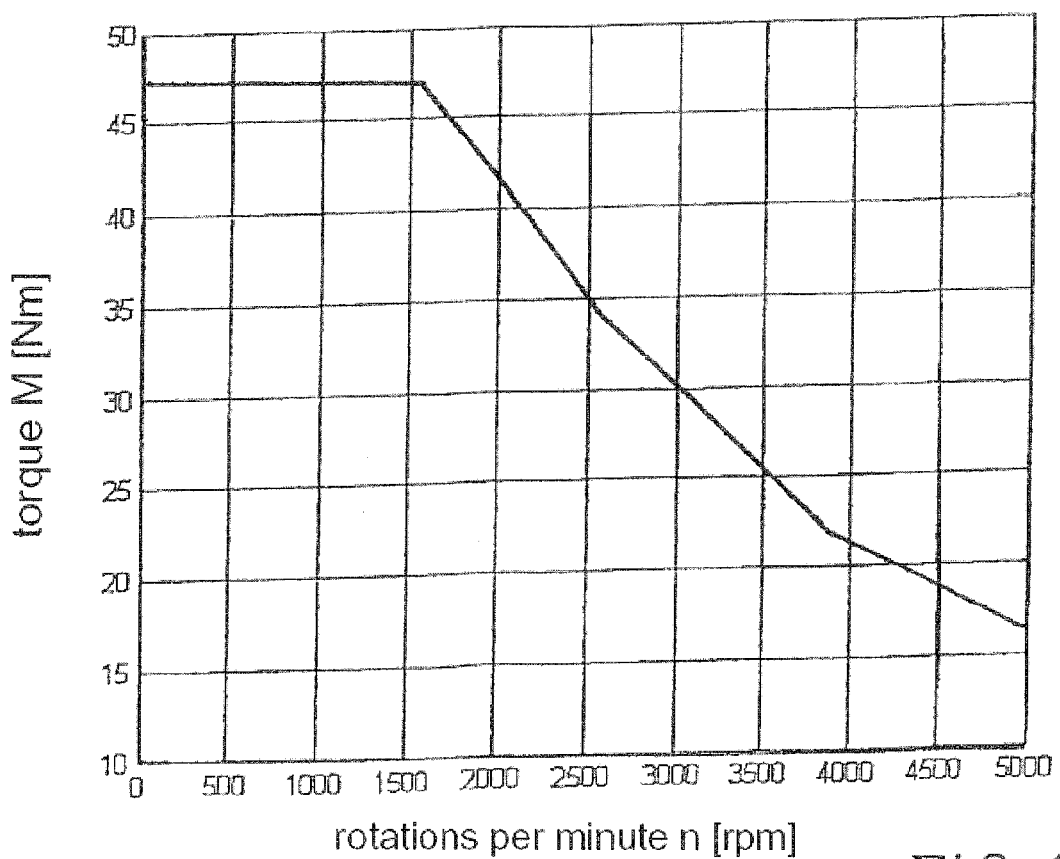

By means of an rpm/torque characteristic, FIG. 2 shows an example of the behaviour of the electrical machine used as the travel drive. As the rpms increase, the available torque significantly decreases. The characteristic essentially shows the curve independent of whether it is the drive torque of the electrical machine operated as a motor, or the braking torque of the regeneratively operated electric machine. By means of regenerative braking at high speeds, that is at high rpms, only a slight braking torque is applied that may not be sufficient to maintain the specified stopping distance for the vehicle.

Increasing the braking torque by increasing the regenerative current above the level shown in FIG. 2 is impossible since the vehicle-specific controls can only constantly process a limited amount of regenerative current during regenerative braking for the sake of the operational stability (maximum current, temperature) of their components. When predetermined maximum temperatures are exceeded, the driving controls therefore limit the output of the vehicle by reducing the speed or output.

Furthermore, when the maximum permissible regenerative current is exceeded in the controls, and overvoltage results that causes an emergency stop. Experience shows that the most frequent case in which such an overvoltage arises is braking during operation on ramps (inclined travel) when the vehicle battery is nearly fully charged since the battery is incapable of accommodating the regenerative current produced in regenerative operation. This applies in particular to batteries with a small capacity; consequently, batteries frequently need to be installed that have a greater capacity than is technically necessary.

Figure 3:
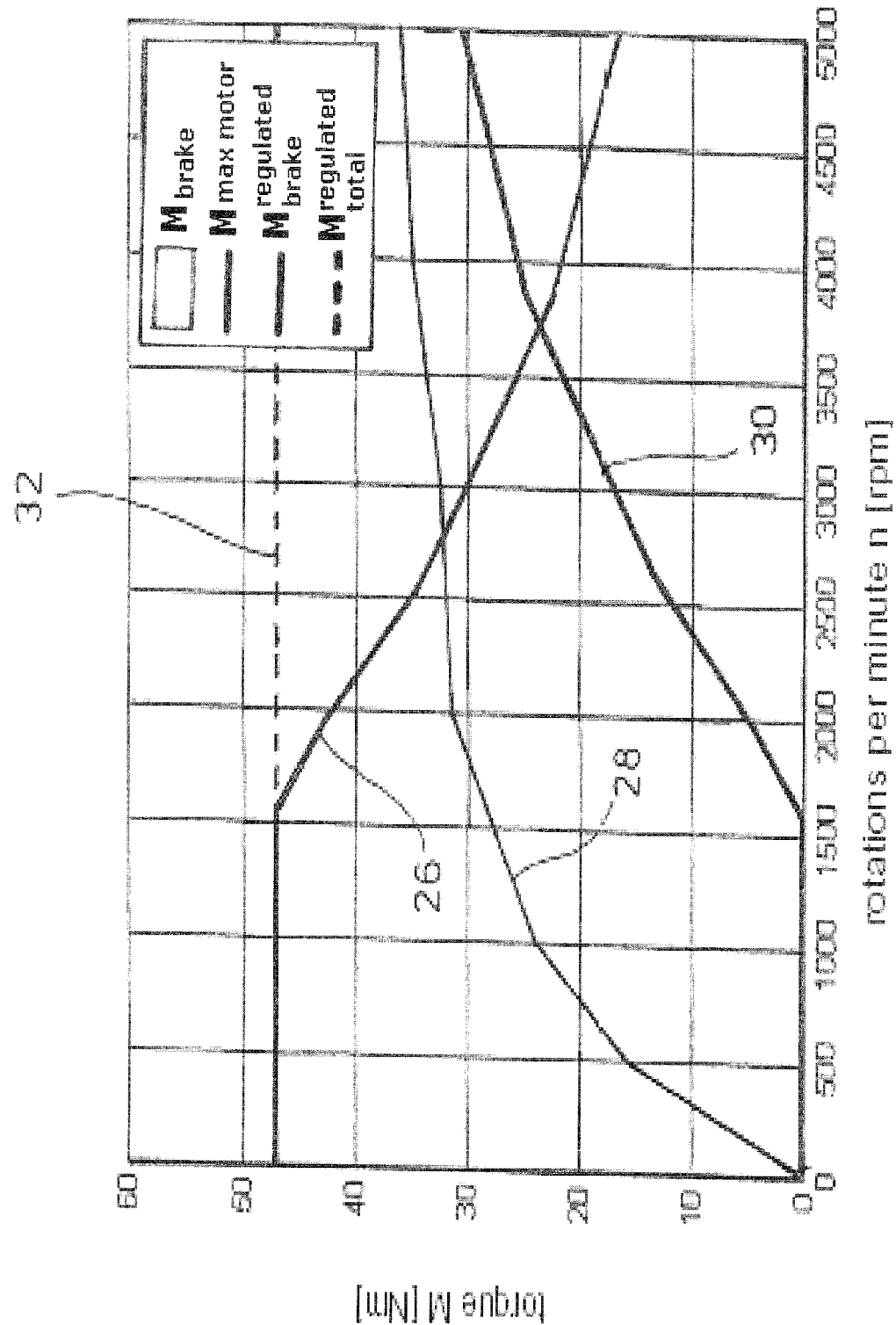

FIG. 3 shows the theoretical rpm/torque characteristic 26 of an asynchronous machine. FIG. 3 also shows the rpm/torque curve 28 in an eddy current brake. It can clearly be seen that the braking torque generated by an eddy current brake is lower at low rpms then at high rpms. Regenerative braking and eddy current braking therefore act in a complementary manner in relation to the rpms. The characteristic 28 shows the braking torque of an eddy current brake in its unregulated operation. When the eddy current brake is in regulated operation, a braking torque can be specified for each rpm that is smaller than the maximum value for the braking torque specified by the characteristic 28. The characteristic 30 shows the regulated braking torque of an eddy current brake. The regulated braking torque 30 in FIG. 3 is selected so that as the braking torque 26 of the travel drive becomes weaker, a constant braking torque 32 continuously results over the entire rpm range. The sum of the braking torque from the motor and the braking torque of the eddy current brake therefore yields a constant braking torque 32.

Figure 4:
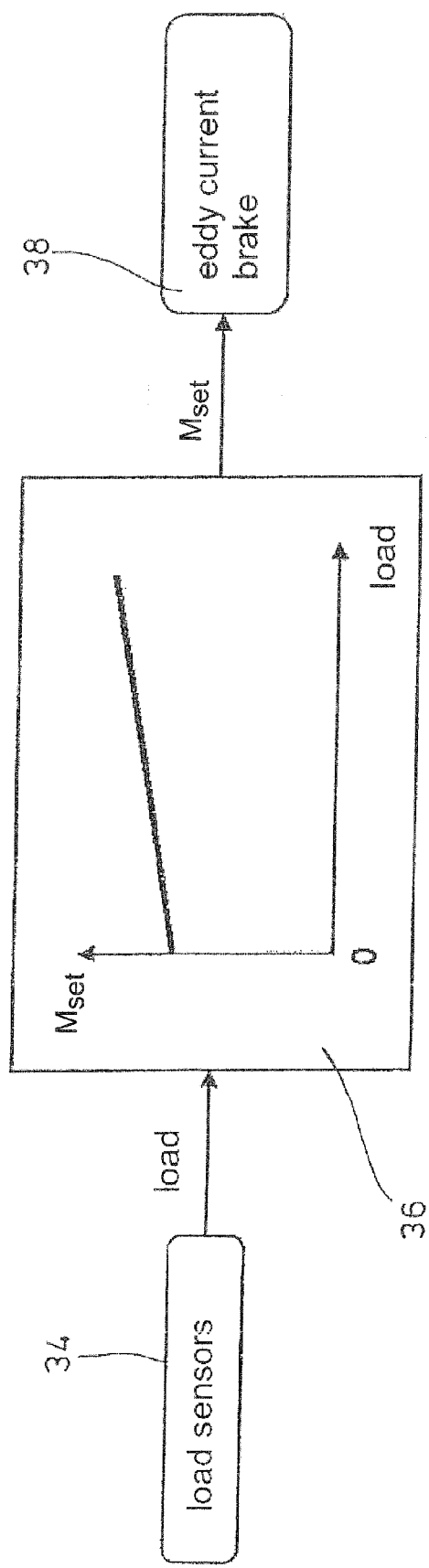

In addition to the above-described rpm-dependent control of the eddy current brake, a load-dependent control of the eddy current brake according to FIG. 4 can be alternately or additionally provided. In this embodiment, the industrial truck possesses a load sensor 34 that determines the value for the load taken on by the industrial truck. With the help of a characteristic 36, a setpoint $M_{set}$ is determined for the braking torque of the eddy current brake depending on the load of the industrial truck. The setpoint for the braking torque resulting from the characteristic 36 is applied to the eddy current brake 38. In this embodiment, the eddy current brake is connected during the braking process depending on the load on the industrial truck. This ensures that when the industrial truck is fully loaded, the eddy current brake 38 is connected with a stronger braking torque than is the case when the industrial truck is only partially loaded. This prevents an industrial truck that does not have a maximum load from being braked too strongly which could endanger the vehicle driver or cause the load to slip.

Figure 5:
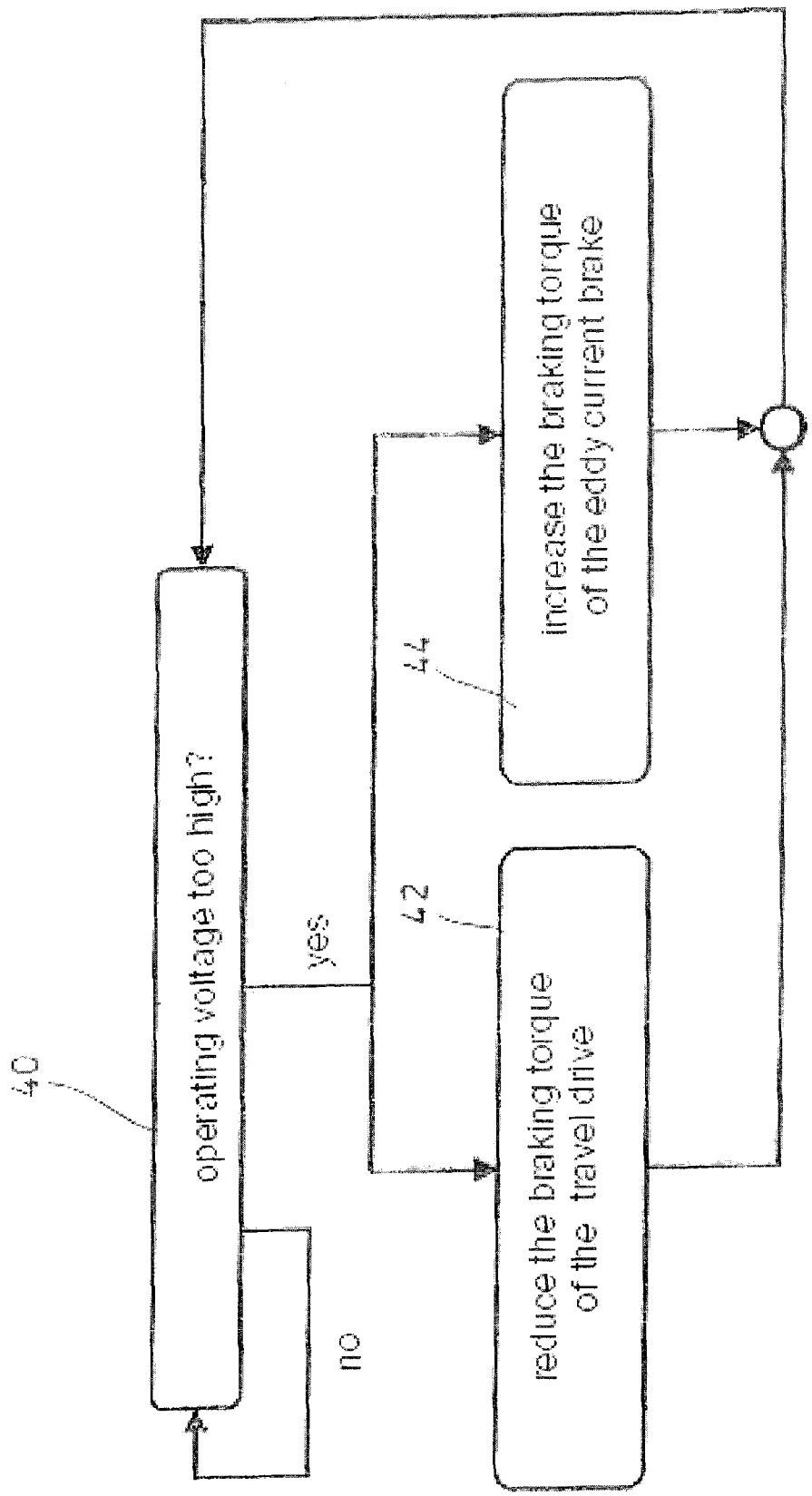

FIG. 5 shows an alternative embodiment that can also be used in addition to the load-dependent and/or rpm-dependent control of the eddy current brake. In this embodiment, the currently existing battery voltage is compared by the controls 20 in a first step 40 to a predetermined maximum value for the battery voltage. If the specified maximum value of the battery voltage is exceeded, the braking torque of the travel drive is reduced in procedural step 42, and the braking torque of the eddy current brake is increased in procedural step 44. Reducing the braking torque of the travel drive avoids further increasing the battery voltage so that an emergency stop of the industrial truck does not have to be triggered. The increase of the braking torque of the eddy current brake provided in step 44 can be configured differently. For example, it is possible to increase the braking torque of the eddy current brake enough to reduce the braking torque of the travel drive.

Figure 6:
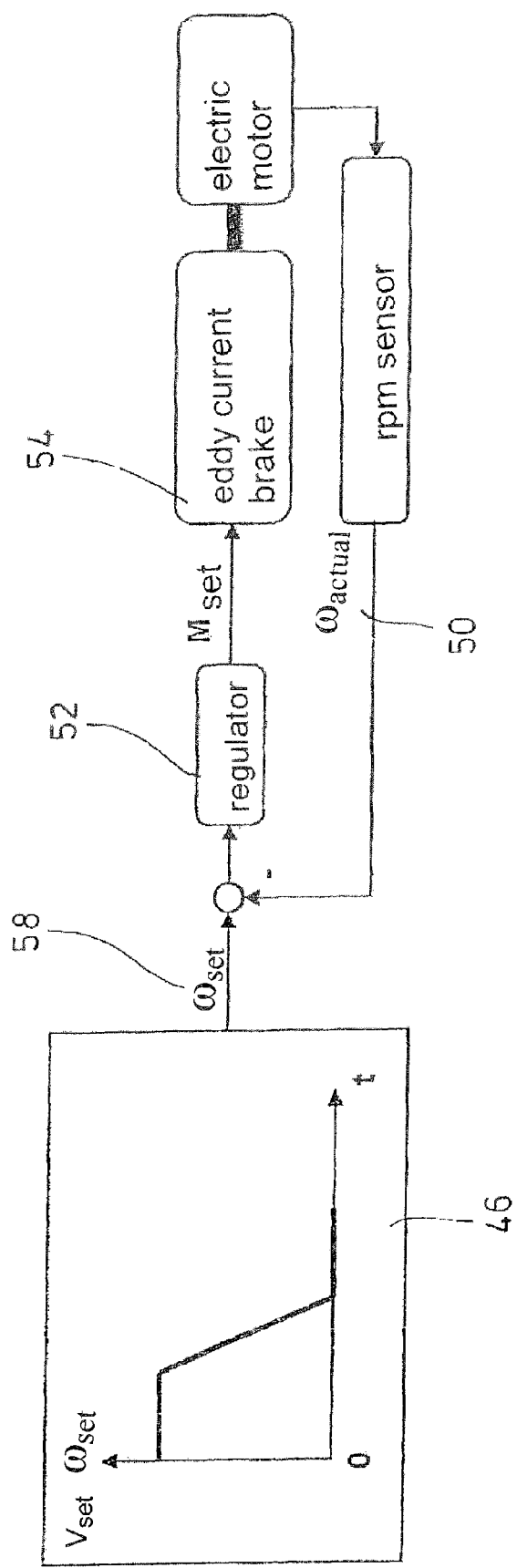

FIG. 6 shows another schematic view of a control of the eddy current brake depending on a time-dependent rpm or speed ramp. This control of the eddy current brake can be used alternatively or in addition to the aforementioned procedure for controlling the eddy current brake.

When the controlling depends upon a speed ramp, a time-dependent setpoint for the rpms 48 is specified by a characteristic 40. The curve of the characteristic 46 is selected so that the setpoint for the rpm is reduced to zero in a ramp-like fashion after the braking procedure starts. The setpoint of the rpm 48 resulting from the characteristic 46 is compared with the actual value of the rpm 50 and is sent to a regulator 52. The regulator 52 forms the setpoint for the eddy current brake 54 from the applied control difference. The eddy current brake 54 acts on the travel drive 56 so that the control path is closed. Using time-dependent setpoints for the rpms and/or speed of the industrial truck ensures that the eddy current brake is smoothly engaged and prevents the vehicle from shaking. Overall, the eddy current brake is initially applied strongly since the motor provides weak braking torque at a high rpm. As the rpms decrease, the torque of the motor increases, and the torque of eddy current brake decreases until it is turned off.

The above disclosure is intended to be illustrative and not exhaustive. This description will suggest many variations and alternatives to one of ordinary skill in this art. All these alternatives and variations are intended to be included within the scope of the claims where the term "comprising" means "including, but not limited to". Those familiar with the art may recognize other equivalents to the specific embodiments described herein which equivalents are also intended to be encompassed by the claims.

Further, the particular features presented in the dependent claims can be combined with each other in other manners within the scope of the invention such that the invention should be recognized as also specifically directed to other embodiments having any other possible combination of the features of the dependent claims. For instance, for purposes of claim publication, any dependent claim which follows should be taken as alternatively written in a multiple dependent form from all prior claims which possess all antecedents referenced in such dependent claim if such multiple dependent format is an accepted format within the jurisdiction (e.g. each claim depending directly from claim 1 should be alternatively taken as depending from all previous claims). In jurisdictions where multiple dependent claim formats are restricted, the following dependent claims should each be also taken as alternatively written in each singly dependent claim format which creates a dependency from a prior antecedent-possessing claim other than the specific claim listed in such dependent claim below.

This completes the description of the preferred and alternate embodiments of the invention. Those skilled in the art may recognize other equivalents to the specific embodiment described herein which equivalents are intended to be encompassed by the claims attached hereto.

The invention claimed is:
1. An industrial truck with an electric travel drive (14) and controls (20) that can switch the electric travel drive (14) to regenerative operation to brake the industrial truck,
   characterized in that an eddy current brake (16) is provided that is controlled or regulated by the controls (20) during regenerative operation (14) to brake the industrial truck, wherein the controls (20) control or regulate the eddy current brake (16) depending on the rpm of the electric travel drive, and wherein the controls (20) control or regulate the eddy current brake (16) in a manner such that the braking torque of the travel drive is supplemented at high rpms, 1500 rpm or higher, by the braking torque generated by the eddy current brake, further characterized in that the controls (20) specify a setpoint for the braking torque to be generated by the eddy current brake, and control or regulate the eddy current brake corresponding to the setpoint, and further wherein the controls determine a setpoint for the eddy current brake in a manner such that the braking torque resulting from the regenerative operation of the travel drive and the eddy current brake is constant.

2. The industrial truck according to claim 1, characterized in that the controls (20) determine the setpoint for the braking torque of the eddy current brake depending on the rpms of the electric travel drive.

3. The industrial truck according to one of claim 1, characterized in that the controls (20) dynamically specify the setpoint for the eddy current brake to prevent the drive wheel or wheels from locking (10) while braking.

4. The industrial truck according to one of claim 1, characterized in that the controls (20) detect the battery voltage arising in regenerative operation of the travel drive and compare it with a predetermined maximum value in order to reduce the braking torque of the travel drive and increase the braking torque of the current brake in case the maximum value of the braking torque is exceeded.

5. The industrial truck according to one of claim 1, characterized in that the controls (20) detect the regenerative current generated in regenerative operation of the travel drive and compare it with a predetermined maximum value in order to reduce the braking torque of the travel drive (14) and increase the braking torque of the eddy current brake in case the maximum value is exceeded.

6. The industrial truck according to claim 5, characterized in that the maximum value for the regenerative current is selected depending on the charge of a vehicle battery.

7. The industrial truck according to one of claim 1, characterized in that the controls (20) detect a load taken on by the industrial truck and select the setpoint for the braking current of the eddy current brake corresponding to the load.

8. The industrial truck according to one of claim 1, characterized in that the controls (20) specify a setpoint for the braking torque of the eddy current brake depending on the time.

9. The industrial truck according to claim 8, characterized in that the controls (20) specify, in a time-dependent manner, a setpoint while braking for the rpm or speed at which the eddy current brake is regulated by the braking torque, and the time-dependent setpoint assumes the value zero in a ramp-like fashion.

10. An industrial truck with an electric travel drive (14) and controls (20) that can switch the electric travel drive (14) to regenerative operation to brake the industrial truck, comprising:

an eddy current brake (16) is provided that is controlled or regulated by the controls (20) during regenerative operation (14) to brake the industrial truck, wherein the controls (20) control or regulate the eddy current brake (16) depending on the rpm of the electric travel drive, and wherein the controls (20) control or regulate the eddy current brake (16) in a manner such that the braking torque of the travel drive is supplemented at high rpms, 1500 rpm or higher, by the braking torque generated by the eddy current brake, further characterized in that the controls (20) specify a setpoint for the braking torque to be generated by the eddy current brake, and control or regulate the eddy current brake corresponding to the setpoint, and further wherein the controls determine a setpoint for the eddy current brake in a manner such that the braking torque resulting from the regenerative operation of the travel drive and the eddy current brake is constant.

* * * * *